(12) United States Patent
Dong et al.

(10) Patent No.: US 12,282,855 B2
(45) Date of Patent: Apr. 22, 2025

(54) AUTO-FORMATTING OF A DATA TABLE

(71) Applicant: Microsoft Technology Licensing, LLC, Redmond, WA (US)

(72) Inventors: Haoyu Dong, Beijing (CN); Zhouyu Fu, Redmond, WA (US); Shi Han, Beijing (CN); Dongmei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 932 days.

(21) Appl. No.: 17/291,818

(22) PCT Filed: Dec. 6, 2019

(86) PCT No.: PCT/US2019/064800
§ 371 (c)(1),
(2) Date: May 6, 2021

(87) PCT Pub. No.: WO2020/131409
PCT Pub. Date: Jun. 25, 2020

(65) Prior Publication Data
US 2022/0027740 A1      Jan. 27, 2022

(30) Foreign Application Priority Data

Dec. 21, 2018   (CN) .......................... 201811575065.3

(51) Int. Cl.
*G06N 3/088*        (2023.01)
*G06F 18/214*       (2023.01)
(Continued)

(52) U.S. Cl.
CPC ........... *G06N 3/088* (2013.01); *G06F 18/214* (2023.01); *G06N 3/045* (2023.01); *G06V 10/95* (2022.01); *G06V 30/412* (2022.01)

(58) Field of Classification Search
None
See application file for complete search history.

(56) References Cited

U.S. PATENT DOCUMENTS 10,699,453 B2 *   6/2020   Jin ............................. G06T 5/50
11,599,711 B2 *   3/2023   Zhong .................. G06V 30/413
(Continued)

FOREIGN PATENT DOCUMENTS

EP              1645972 A2       4/2006

OTHER PUBLICATIONS

Heljakka, "GANs for Simulation, Representation and Inference," Nov. 18, 2017, https://becominghuman.ai/gans-for-simulation-representation-and-inference-d215c251ed12.*
(Continued)

*Primary Examiner* — Ryan Barrett
(74) *Attorney, Agent, or Firm* — Schwegman Lundberg & Woessner, P.A.

(57) ABSTRACT

According to implementations of the present disclosure, there is provided a solution for auto-formatting of a data table. A computer-implemented method comprises obtaining values of at least one attribute for a plurality of cells in a data table, the values of the at least one attribute indicating at least one of a semantic meaning of data filled in the cells or a structure of the data table, the cells being arranged in rows and columns in the data table; extracting a feature representation of the values of the at least one attribute In using a first learning network; and determining respective formats for the cells based on the feature representation using at least the first learning network. In this way, it is possible to implement automatic mapping from attribute settings of cells to cell formats by using a learning network, thereby achieving auto-formatting of the data table.

15 Claims, 5 Drawing Sheets

(51) Int. Cl.
  *G06N 3/045* (2023.01)
  *G06V 10/94* (2022.01)
  *G06V 30/412* (2022.01)

(56) References Cited

U.S. PATENT DOCUMENTS

| | | | | |
|---|---|---|---|---|
| 2002/0013792 | A1* | 1/2002 | Imielinski | G06F 40/117 |
| | | | | 715/239 |
| 2011/0029852 | A1* | 2/2011 | Naibo | G06F 40/18 |
| | | | | 715/212 |
| 2011/0249905 | A1* | 10/2011 | Singh | G06V 30/412 |
| | | | | 382/225 |
| 2013/0091437 | A1 | 4/2013 | Ludwig et al. | |
| 2015/0093021 | A1* | 4/2015 | Xu | G06V 30/412 |
| | | | | 382/159 |
| 2017/0315683 | A1 | 11/2017 | Boucher et al. | |
| 2018/0336184 | A1 | 11/2018 | Bellegarda et al. | |
| 2020/0097711 | A1* | 3/2020 | Venkateswaran | G06V 30/413 |
| 2020/0410231 | A1* | 12/2020 | Chua | G06F 18/2413 |
| 2021/0209297 | A1* | 7/2021 | Dong | G06F 40/106 |
| 2021/0406266 | A1* | 12/2021 | Chan | G06N 3/044 |
| 2022/0318224 | A1* | 10/2022 | Thompson | G06V 10/70 |
| 2023/0153319 | A1* | 5/2023 | Goodsitt | G06F 16/258 |
| | | | | 707/756 |
| 2023/0177764 | A1* | 6/2023 | Kent | G06T 15/04 |
| | | | | 345/419 |

OTHER PUBLICATIONS

Ghasemi-Gol et al., "Tabular Cell Classification Using Pre-Trained Cell Embeddings," 2019 IEEE International Conference on Data Mining (ICDM), https://ieeexplore.ieee.org/document/8970946.*

Qasim et al., Rethinking Table Parsing using Graph Neural Networks, Jul. 3, 2019, https://arxiv.org/abs/1905.13391.*

Shaikh, "Introductory guide to Generative Adversarial Networks (GANs) and their promise!," Jun. 15, 2017, https://web.archive.org/web/20170930100042/https://www.analyticsvidhya.com/blog/2017/06/introductory-generative-adversarial-networks-gans/.*

Cavnar, et al., "N-Gram-Based Text Categorization", In Proceedings of the 3rd Annual Symposium on Document Analysis and Information Retrieval, Apr. 11, 1994, 14 Pages.

Chen, et al., "Photographic Image Synthesis with Cascaded Refinement Networks", In Proceedings of the International Conference on Computer Vision, Oct. 22, 2017, pp. 1520-1529.

Durugkar, et al., "Generative Multi-Adversarial Networks", https://arxiv.org/abs/1611.01673v1, Nov. 5, 2016, 14 Pages.

Fang, et al., "Table Header Detection and Classification", In Proceedings of the 26th AAAI Conference on Artificial Intelligence, Jul. 14, 2012, pp. 599-605.

Gatterbauer, et al., "Table Extraction using Spatial Reasoning on the CSS2 Visual Box Model", In Proceedings of the 21st National Conference on Artificial Intelligence, vol. 2, Jul. 16, 2006, pp. 1313-1318.

Gatys, et al., "Image Style Transfer Using Convolutional Neural Networks", In Proceedings of the IEEE Conference on Computer Vision and Pattern Recognition, Jun. 27, 2016, pp. 2414-2423.

Goodfellow, et al., "Generative Adversarial Nets", In Proceedings of the Advances in Neural Information Processing Systems, Jun. 10, 2014, 9 Pages.

Kim, et al., "Learning to Discover Cross-Domain Relations with Generative Adversarial Networks", In Repository of arXiv:1703.05192v1, Mar. 15, 2017, 10 Pages.

Kingma, et al., "Adam: A Method for Stochastic Optimization", https://arxiv.org/abs/1412.6980v1, Dec. 22, 2014, 9 Pages.

Ledig, et al., "Photo-Realistic Single Image Super-Resolution using a Generative Adversarial Network", In Proceedings of the IEEE Conference on Computer Vision and Pattern Recognition, Jul. 21, 2017, pp. 105-114.

Liu, et al., "Identifying Table Boundaries in Digital Documents via Sparse Line Detection", In Proceedings of the 17th ACM Conference on Information and Knowledge Management, Oct. 2008, pp. 1311-1320.

Long, et al., "Fully Convolutional Networks for Semantic Segmentation", In Proceedings of the IEEE Conference on Computer Vision and Pattern Recognition, Jun. 7, 2015, pp. 3431-3440.

Pathak, et al., "Context Encoders: Feature Learning by Inpainting", In Proceedings of the IEEE Conference on Computer Vision and Pattern Recognition, Jun. 27, 2016, pp. 2536-2544.

Ronneberger, et al., "U-Net: Convolutional Networks for Biomedical Image Segmentation", In Proceedings of the International Conference on Medical Image Computing and Computer-Assisted Intervention, Oct. 5, 2015, pp. 234-241.

Tzeng, et al., "Adversarial Discriminative Domain Adaptation", In Proceedings of the IEEE Conference on Computer Vision and Pattern Recognition, Jul. 21, 2017, pp. 2962-2971.

Wang, et al., "High-Resolution Image Synthesis and Semantic Manipulation With Conditional GANs", In Proceedings of the IEEE Conference on Computer Vision and Pattern Recognition, Jun. 18, 2018, pp. 8798-8807.

Zhu, et al., "Generative Visual Manipulation on the Natural Image Manifold", In Proceedings of the European Conference on Computer Vision, Oct. 8, 2016, pp. 597-613.

"International Search Report and Written Opinion Issued in PCT Application No. PCT/US2019/064800", Mailed Date: Mar. 10, 2020, 10 Pages.

"Second Office Action Issued in Chinese Patent Application No. 201811575065.3", Mailed Date: Sep. 18, 2023, 6 Pages.

"First Office Action and Search Report Issued in Chinese Patent Application No. 201811575065.3", Mailed Date: Mar. 29, 2023, 13 Pages.

* cited by examiner

AUTO-FORMATTING OF A DATA TABLE

CROSS-REFERENCE TO RELATED APPLICATION

This application is a U.S. National Stage Filing under 35 U.S.C. 371 of International Patent Application Serial No. PCT/US2019/064800, filed Dec. 6, 2019, and published as WO 2020/131409 A1 on Jun. 25, 2020, which claims priority to Chinese Application No. 201811575065.3, filed Dec. 21, 2018, which applications and publication are incorporated herein by reference in their entirety.

BACKGROUND

Many electronic document development tools can allow users to create data tables for organizing and presenting data in various structures. For example, spreadsheets are the most popular end-user development tool. Unlike table structures in conventional databases, editable data tables in many electronic documents, such as spreadsheets, can provide effective visualization for data presentation. Since data tables typically have various structures and layouts on cells, they can intuitively indicate data correspondence for easy lookup or serve side-by-side comparison for higher-order knowledge exhibition. From this visual perspective, table formatting such as border, alignment, font and the like, significantly helps with layout shaping and structure scoping. Thus, data table formatting is an important task in end-user development using spreadsheets. At present, table formatting is mainly performed manually by users, which is tedious and time-consuming. For professional and complex tables in, for example, finance and government domains, the manual formatting is particularly difficult.

SUMMARY

According to implementations of the subject matter described herein, there is provided a solution for auto-formatting of a data table. In the solution, a computer-implemented method comprises obtaining values of at least one attribute for a plurality of cells in a data table, the values of the at least one attribute indicating at least one of a semantic meaning of data filled in the plurality of cells or a structure of the data table, the plurality of cells being arranged in rows and columns in the data table; extracting a feature representation of the values of the at least one attribute using a first learning network; and determining respective formats for the plurality of cells based on the feature representation using at least the first learning network. In this way, it is possible to implement automatic mapping from attribute settings of cells to cell formats by using a learning network, thereby achieving auto-formatting of the data table.

The Summary is to introduce a selection of concepts in a simplified form that are further described below in the Detailed Description. This Summary is not intended to identify key features or essential features of the present disclosure, nor is it intended to be used to limit the scope of the subject matter described herein.

BRIEF DESCRIPTION OF THE DRAWINGS

Throughout the drawings, the same or similar reference symbols refer to the same or similar elements.

DETAILED DESCRIPTION OF EMBODIMENTS

Principles of the subject matter described herein will not be described with reference to several example implementations. It would be appreciated that description of those implementations is merely for the purpose of enabling those skilled in the art to better understand and further implement the subject matter described herein and is not intended for limiting the scope disclosed herein in any manner.

As used herein, the term "includes" and its variants are to be read as open-ended terms that mean "includes, but is not limited to." The term "based on" is to be read as "based at least in part on." The terms "an implementation" and "one implementation" are to be read as "at least one implementation." The term "another implementation" is to be read as "at least one other implementation." The term "first," "second" or the like can represent different or the same objects. Other definitions, either explicit or implicit, may be included below.

As described above, formatting of data tables facilitates visualized presentation of data and can achieve the goals of easy look-up, side-by-side comparison, or the like. At present, table formatting is mainly performed manually by users, which is tedious and time-consuming. Some data table editing tools, such as Excel Spreadsheet, provide some format templates. However, such formatting templates are only applicable to regions of a data table that are specified by the users, outputting fixed formatting results which may not match the actual data and the structure in the regions of the data table. Spreadsheet editing tools can also provide conditional formatting functions that allow users to manually define some conditions and conduct batch formatting, for example, cell coloring or visual augmentation, when detecting that conditions are met. However, these types of formatting still cannot achieve automatic and appropriate format selection for data tables can be implemented in none of.

Basic Work Principles and Example Environment

Implementations of the subject matter described herein provide a solution for auto-formatting of a data table. The solution uses a learning network to extract a feature representation from attribute values of respective cells in a data table to be formatted and determines, based on the feature representation, respective formats of a plurality of cells. In this way, the learning network implements automatic mapping from attribute settings of cells to cell formats.

Figure 1:
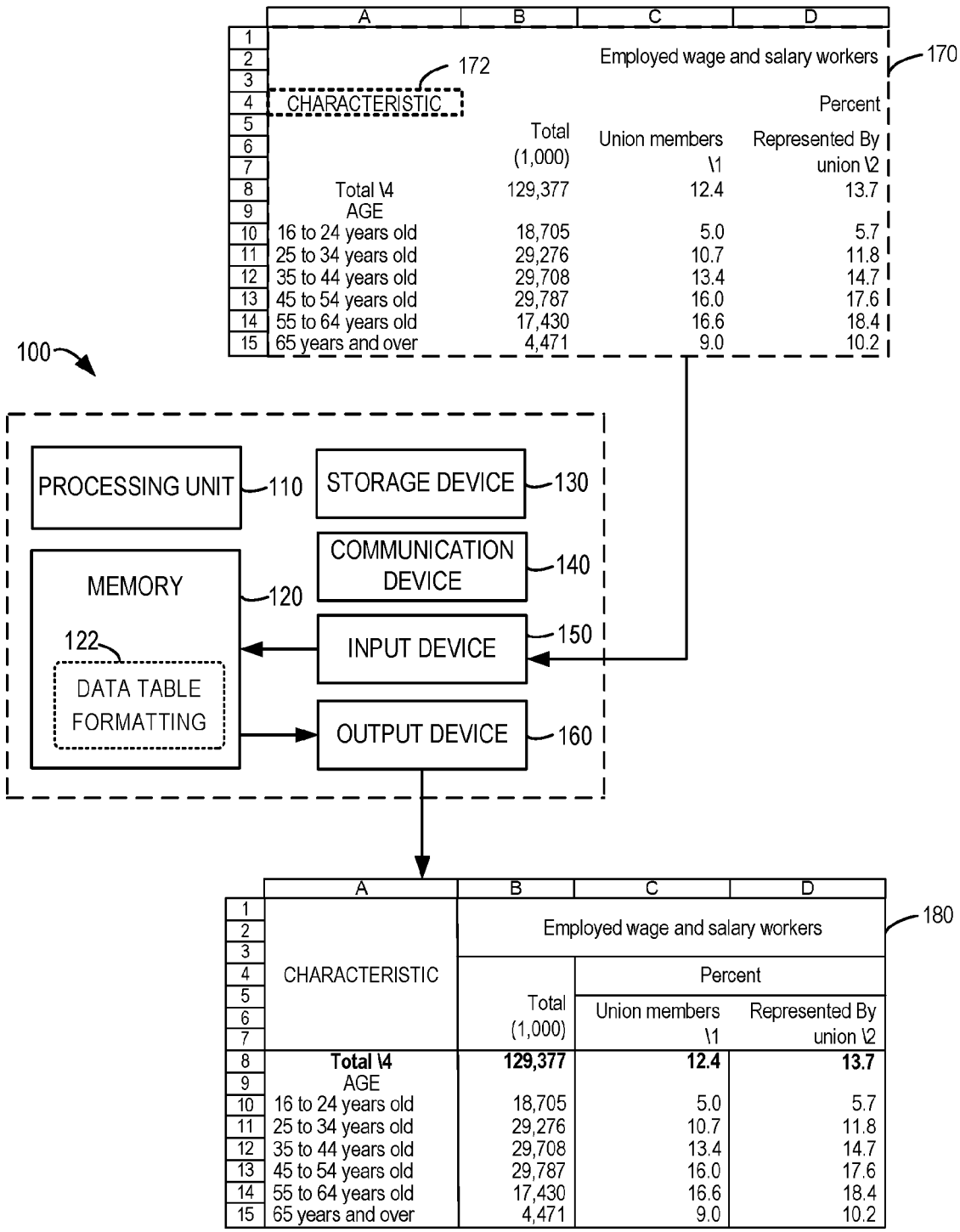
FIG. 1 illustrates a block diagram of a computer environment in which various implementations of the subject matter described herein can be implemented.

Basic principles and various example implementations of the subject matter described herein will now be described with reference to the drawings. FIG. 1 illustrates a block diagram of a computing device 100 in which various implementations of the subject matter described herein can be implemented. It would be appreciated that the computing device 100 as shown in FIG. 1 is merely provided as an example, without suggesting any limitation to the functionalities and scope of implementations of the subject matter described herein. As shown in FIG. 1, the computing device 100 includes a computing device 100 in form of a general-purpose computing device. Components of the computing device 100 can include, but are not limited to, one or more processors or processing units 110, a memory 120, a storage device 130, one or more communication units 140, one or more input devices 150, and one or more output devices 160.

In some implementations, the computing device 100 can be implemented as various user terminals or server ends. The service ends may be any server, large-scale computing device, and the like provided by various service providers. The user terminal may be, for example, any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, TV receiver, radio broadcast receiver, E-book device, gaming device or any combinations thereof, including accessories and peripherals of these devices or any combinations thereof. It would be appreciated that the computing device 100 can support any type of interface for a user (such as "wearable" circuitry and the like).

The processing unit 110 can be a physical or virtual processor and can implement various processes based on programs stored in the memory 120. In a multi-processor system, a plurality of processing units execute computer-executable instructions in parallel so as to improve the parallel processing capability of the computing device 100. The processing unit 110 may also be referred to as a central processing unit (CPU), a microprocessor, a controller and a microcontroller.

The computing device 100 usually includes various computer storage medium. The computer storage medium may be any available medium accessible by the computing device 100, including but not limited to, volatile and non-volatile medium, or detachable and non-detachable medium. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The storage device 130 may be any detachable or non-detachable medium and may include machine-readable medium such as memory, a flash drive, a magnetic disk or any other medium, which can be used for storing information and/or data and accessed in the computing device 100.

The computing device 100 can further include additional detachable/non-detachable, volatile/non-volatile memory medium. Although not shown in FIG. 1, it is possible to provide a disk drive for reading from or writing into a detachable and non-volatile disk and an optical disk drive for reading from and writing into a detachable non-volatile optical disc. In such cases, each drive may be connected to a bus (not shown) via one or more data medium interfaces.

The communication unit 140 communicates with a further computing device via the communication medium. In addition, the functions of components in the computing device 100 may be implemented by a single computing cluster or multiple computing machines that can communicate via communication connections. Therefore, the computing device 100 can operate in a networked environment using a logical connection with one or more other servers, network personal computers (PCs) or further general network nodes.

The input device 150 may include one or more of various input devices, such as a mouse, keyboard, tracking ball, voice-input device, and the like. The output device 160 may include one or more of various output devices, such as a display, loudspeaker, printer and the like. By means of the communication unit 140, the computing device 100 can further communicate with one or more external devices (not shown) such as the storage devices and display device, with one or more devices enabling the user to interact with the computing device 100, or any devices (such as a network card, a modem and the like) enabling the computing device 100 to communicate with one or more other computing devices, if required. Such communication may be performed via input/output (I/O) interfaces (not shown).

In some implementations, as an alternative of being integrated on a single device, some or all components of the computing device 100 may also be arranged in form of cloud computing architecture. In the cloud computing architecture, the components may be provided remotely and work together to implement the functions described in the subject matter described herein. In some implementations, cloud computing provides computing, software, data access and storage service, which will not require end users to be aware of the physical positions or configurations of the systems or hardware providing these services. In various implementations, the cloud computing provides the services via a wide region network (such as Internet) using proper protocols. For example, a cloud computing provider provides applications over the wide region network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functions described herein from a service provider at a remote location. Alternatively, they may be provided from a conventional server or installed directly or otherwise on a client device.

The computing device 100 can be used to implement auto-formatting of a data table in various implementations of the subject matter described herein. The memory 120 may include one or more modules having one or more program instructions. These modules can be accessed and executed by the processing unit 110 to perform functions of various implementations described herein. For example, the memory 120 may include a data table formatting module 122 for auto-formatting of a data table.

Upon performing the formatting, the computing device 100 can receive a data table 170 via the input device 150. The data table 170 includes a plurality of cells 172 arranged in rows and columns. Each of the cells 172 is defined by a corresponding row and column. As an example, in the data table 170 of FIG. 1, a plurality of cells 172 are defined by rows 1 through 15 and columns A through D. For convenience of understanding, a cell 172 defined by row 4 and column A is indicated with a dashed line block in FIG. 1.

The data table 170 is provided to the data table formatting module 122 such that the data table formatting module 122 determines respective formats for the cells in the data table 170. The data table formatting module 122 can optionally apply the determined formats to the data table 170 and output a formatted data table 180 via the output device 160. It would be appreciated that the form of the data table, the data included in the data table, and the formats for the data table shown in FIG. 1 are provided only as examples.

A data table herein refers to an editable table in an electronic document tool. The data table is formed by cells arranged in rows and columns. At least one cell in the data table is filled with data (which are also referred to as content). The electronic document providing an editable table may, for example, include an electronic spreadsheet, a text document that can be inserted with a data table, Power Point, or the like. A plurality of electronic document tools, such as a spreadsheet application, a word processing application, a Power Point application, and the like, can provide data table editing in terms of data, structure, formats, or the like.

A format for a cell in a data table herein can include a type of visual presentation that can be applied to the cell, examples of which include, but are not limited to border, color filling, pattern filling, font, font color, alignment, or the like. The example of FIG. 1 shows that two types of formats, border and alignment, are determined by the data table formatting module 122 for respective cells 172 of the input data table 170, and the determined formats are presented in the formatted data table 180.

Reference will be made to FIGS. 2-6 to describe in detail how the data table formatting module 122 determines formats for the cells in the data table 170 below.

Basic Implementation Architecture

Figure 2:
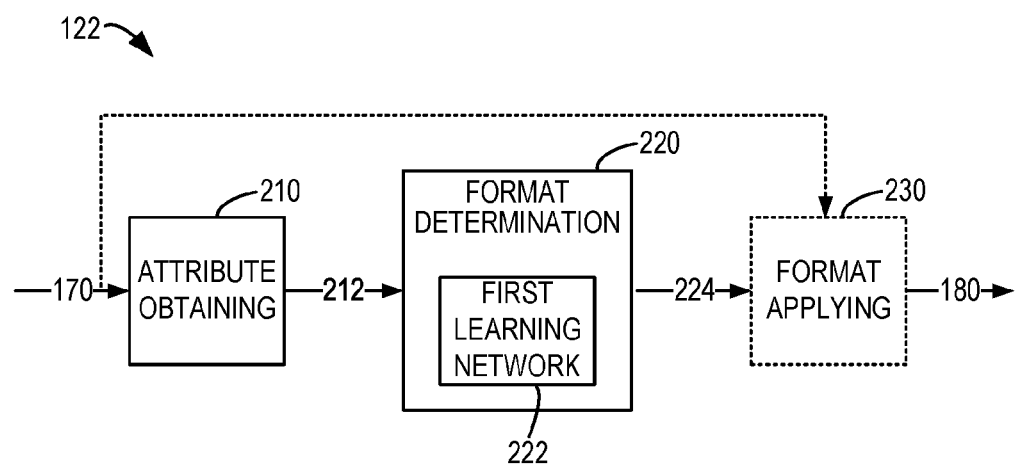
FIG. 2 illustrates a block diagram of a data table formatting module according to an implementation of the subject matter described herein.

FIG. 2 illustrates a learning network-based data formatting module 122 according to some implementations of the subject matter described herein. As shown, the data table formatting module 122 includes an attribute obtaining module 210 and a format determination module 220. The data table formatting module 122 may optionally include a format applying module 230.

The attribute obtaining module 122 obtains a value(s) 212 of one or more attributes of a plurality of cells 172 of the data table 170. The data table 170 can be included in a page of an electronic document, for example, a tab of a spreadsheet file, or can be inserted into a page of a word document. The data table 170 can be of a fixed size, for example, a predetermined length (defined by the number of columns) and width (defined by the number of rows) in a page of a document. In this case, the values 212 of the attributes of the cells 172 can be obtained from a predetermined range. The data table 170 may also be of an unfixed size, and then the size of the data table can be determined by regions where non-empty cells of the spreadsheet are located. In some implementations, the range of the data table 170 can be automatically detected or defined from the page of the electronic document, using a table detection technology. In some other implementations, the range of the data table 170 can also be identified manually by a user. In an end-user development tool for tables, such as spreadsheets, one spreadsheet tab can be alternatively considered as a data table.

According to implementations of the subject matter described herein, in order to format a data table, one or more aspects of attributes of respective cells in the data table are taken into account to determine formats applied to respective regions of the data table. An attribute of each cell 172 of the data table 170 can be related to one or more aspects of data filled in the cell or a setting(s) of the cell. Therefore, values of attributes of all the cells in the data table can indicate a semantic meaning of the data filled in the respective cells and/or indicate a structure of the data table. A value of an attribute herein refers to how a certain attribute is set with respect to a cell. Such value is not necessarily a numerical value but may be any other type of data/information for indicating the specific setting of the attribute.

In some implementations, for a given cell 172, values of the following attributes can be considered for indicating a semantic meaning of data filled in the cell, including a length of the data filled therein, a type(s) of the data, and/or proportions of different types of data filled in the given cell 172. The length of data may be indicated, for example, by the number of characters contained in the data. The types filled in the cell may be categorized in different granularities, for example, into a text type and a numerical value type. The data of the numerical value type may be further subdivided into finer categories such as numerals, dates, times, and the like. The data of the text type may also be subdivided, for example, by languages or the like.

Alternatively, or in addition, the attributes for indicating the semantic meaning of the data filled in the given cell 172 can also include the data filled therein, and/or an editing formula for generating the data of the given cell 172. It is typical to obtain data of cells using formulas, for example, in the spreadsheet application. For example, a mathematical formula or statistics formula can be input into a certain cell 172 to calculate and/or aggregate numbers, and/or aggregate the text in one or more other cells. The formula used in a cell can facilitate understanding of the data filled in the current cell 172. It would be appreciated that many applications for generating data tables provide various examples of such formulas, and formulas equations will be developed in the future for generating data in cells, part or all of which can be taken into account here.

One or more attributes of a plurality of adjacent rows and/or columns in a data table may be set to present the structure of the data table. The data organization manner can also serve as an attribute and may be used to determine the formats. The attribute for indicating the structure of the data table, for example, can include whether cells are merged to present data therein. Thus, the attribute obtaining module 210 may alternatively or additionally obtain information related to a merging status of the given cell 172. The merging status indicates whether the given cell 172 is merged with a further cell 172 to present the data filled therein, or the merging manner with the further cell. For example, one merging status may indicate whether the given cell 172 is merged, and another merging status may indicate the cell in which direction is merged with the given cell 172 (for example, the cell in the left adjacent column, the cell in the right adjacent column, the cell in the top adjacent row, and/or the cell in the bottom adjacent row). In addition to the merging status, or as an alternative, the attribute obtaining module 210 may also determine other aspects of settings of the cell 172 in the data table 170, such as a row height, a column width, or the like of the cell.

The values 212 of the attributes of the respective cells 172 depend on specific settings/configurations of the cells 172 in generation of the data table 170, and the main purpose of the settings/configurations is to facilitate the organization and presentation of the data. The values 212 of the attributes may be extracted from metadata of the electronic document containing the data table 170 or from other data sources. One or more attributes of interest by the attribute obtaining module 210 may be preconfigured so as to obtain the specific values 212 of the respective attributes from the input data table 170. In some implementations, the attribute obtaining module 210 may represent the obtained values 212 of the attributes in a two-dimensional structure of rows and columns of the data table 170, and the two-dimensional structure includes the values 212 of the attributes extracted for the respective cell 172. Of course, the values 212 of the attributes extracted for the whole data table 170 may also be represented in other forms.

The values 212 of the attributes obtained by the attribute obtaining module 210 are provided to the format determination module 220. The format determination module 220 determines, based on the values 212 of the attributes, respective formats 224 for the plurality of cells 172 of the data table 170. The format determination module 220 may determine, for each cell 172, one or more types of formats 224. As discussed above, the example formats applicable to the cells include, but are not limited to, border, color filling, pattern filling, font, font color, and data alignment. These types of formats can be used to facilitate presentation of the data in the data table 170 in different manners. For example, borders of cells can help represent the structure of the table, especially the hierarchical headers and respective data regions, thereby enabling easy data look-up. Data alignment of the cells can provide concise and clear data representation.

When determining the formats, the format determination module 220 may determine, for each cell 172, whether one or more formats from a set of formats of predetermined types are applied to the cell. The application modes for some types of formats may be varied, and it thus may be further determined in which mode the formats are applied to the cell. For convenience of understanding, the border format and the alignment format are provided as examples for illustration. For a cell 172, horizontal borders and vertical borders are possible to be applied to the cell. The format determination module 220 may determine whether a horizontal border(s) and/or a vertical border(s) are applied to the cell 172. The alignment format of the cell 172 may include horizontal alignment and vertical alignment. Further, the horizontal alignment may include left alignment, center alignment, and right alignment, and the vertical alignment may include top alignment, vertical centering, and bottom alignment. The format determination module 220 may output a respective label indication to indicate whether a border and/or an alignment format are applied for each of the cells. For example, a Boolean value (for example, 0 and 1) may be used to indicate whether a certain type of format is used. For example, the value of 0 indicates absence of that format and the value of 1 indicates presence of that format, or vice versa. If there are a plurality of application modes for a certain format, different values may be used to indicate different application modes. For example, for the horizontal alignment, three different values, such as values of 0, 1, and 2, may be used to indicate the left alignment, center alignment, and right alignment, respectively. The vertical alignment may also be indicated similarly.

As an example, some example formats and corresponding label indications are given below in Table 1.

TABLE 1

Some Examples of Formats and Label Indications for a Cell

| Format name | Description | Label indication |
| --- | --- | --- |
| Horizontal border | Is the horizontal border of a cell present? | Boolean value from {0, 1} |
| Vertical border | Is the vertical border of a cell present? | Boolean value from {0, 1} |
| Horizontal alignment | Is the horizontal alignment of a cell a left alignment, center alignment, or right alignment? | Discrete value from {0, 1, 2} |
| Vertical alignment | Is the vertical alignment of a cell is a top alignment, vertical centering, or bottom alignment? | Discrete value from {0, 1, 2} |

It would be appreciated that although for a single cell 172, the horizontal border specifically includes two options (i.e., a top border and a bottom border) and the vertical border specifically includes two options (i.e., a left border and a right border), by determining whether a specified horizontal border (i.e., the top or bottom border) and a specified vertical border (i.e., the left or right border) of each cell in the data table 170 are present, the other type of the horizontal border and vertical border may be determined for the adjacent cell. As for the horizontal and vertical alignments, if it is assumed that a certain mode of horizontal alignment and vertical alignment is always set for each cell, there is no need to use specific labels to indicate absence of the horizontal or vertical alignment.

It would be appreciated that the implementations as discussed above and Table 1 only provide some example formats and possible label indications for the cells 172. In other implementations, the format determination module 220 may be used to determine other types of formats, and/or other label indications may be used to differentiate different formats and application modes. For example, as for the format of color filling, the format determination module 220 may determine whether a certain cell 172 is filled with a color (for example, a default filled color), and may further determine which color from a plurality of colors may be used for filling (for example, it is indicated which color from the plurality of colors is present, in absence of other colors). For other format types having multiple choices, corresponding label indications may also be utilized.

Based on the values 212 of the attributes, the format determination module 220 may determine, for each cell 172, which format from a set of predetermined types of formats is to be applied to the cell and how it is applied to the cell. For following analysis, values of one or more attributes of each cell 172 may be vectorized. Vectorization is also referred to as numeralization or characterization in a predetermined range to represent corresponding information with numerical values. A mapping rule may be predetermined. For example, the length of the data in each cell 172 may be mapped to a predetermined numerical range. If the cell 172 is not filled with any data, the length may be valued to zero. Whether different types of data are present may be indicated by corresponding Boolean values (for example, values of 0 or 1), where a value of 0 may indicate that the data of a corresponding type is absent, and a value of 1 indicates that the data of the corresponding type is present, or vice versa. Proportions of different types of data may be normalized within a numerical range from 0 to 1. For different merging statuses, corresponding Boolean values may also be used to indicate whether the corresponding merging statuses are present. As an example, some example attributes and possible mapping values are given below in Table 2.

TABLE 2

Example Attributes and Mapping Values of a Cell

| No. | Attribute | Description | Mapping value |
|---|---|---|---|
| 1 | Length of data | Length of data, represented as a log value of the length | Floating point number for representing the specific length |
| 2 | Proportion of a text | Proportion of data of a text type in a cell | Range of [0.0, 1.0] |
| 3 | Proportion of numerical values | Proportion of data of a numerical type in a cell | Range of [0.0, 1.0] |
| 4 | First merging status indicating whether merging is executed | Is a cell merged with a further? | Boolean value from {0, 1} |
| 5 | Second merging status indicating merging with the top one | Is a cell merged with a cell in a top adjacent row? | Boolean value from {0, 1} |
| 6 | Third merging status indicating merging with the bottom one | Is a cell merged with a cell in a bottom adjacent row? | Boolean value from {0, 1} |
| 7 | Fourth merging status indicating merging with the left one | Is a cell merged with a cell in a left adjacent row | Boolean value from {0, 1} |
| 8 | Fifth merging status indicating merging with the right one | Is a cell merged with a cell in a right adjacent row | Boolean value from {0, 1} |
| 9 | Numeral type | Is data of a numeral value type represented as a numeral(s)? | Boolean value from {0, 1} |
| 10 | Date type | Is data of a numeral value type represented as a date? | Boolean value from {0, 1} |
| 11 | Other type | Is data of a numeral value type represented in other types? | Boolean value from {0, 1} |

In some other examples, if the attributes under the concern also include the data filled in the cell 172, a semantic feature representation may be extracted for the data filled in the cell 172 so as to facilitate understanding of data. Extraction of the semantic feature representation may be executed using various natural language processing tools and the subject matter described herein is not limited in this regard. The semantic feature representation typically includes a plurality of feature values which may differentiate different semantic meanings. In addition, the formula used in the cell 172 may be mapped to a certain numerical representation, so as to determine whether a formula is used, the type of the used formula, and/or other cells that are involved in the formula. It would be appreciated that the implementations as discussed above and Table 2 only provide some example attributes of the cell 172 and their possible mapping values. In other implementations, attributes of the cell 172 in other aspects may also be obtained as long as the attributes can facilitate indication of the semantic meaning of the data and/or the structure of the data table. Moreover, other mapping values may be used to differentiate the values of the attributes.

The value(s) of at least one attribute of each cell 172 may be combined, for example, into a multidimensional vector. For example, an attribute list based on Table 2 may form an 11-dimensional vector. By vectorizing the values of attributes of a plurality of cells 172 in the data table 170, corresponding vectorized representations may be obtained. A vectorized representation includes a vectorized result corresponding to the value(s) of the attribute(s) of each cell 172.

According to the implementations of the subject matter described herein, the format determination module 220 implements, based on the learning network 222, mapping from the values 212 of the attributes (specifically, the vectorized representation of the values 212 of the attributes) to the formats 224 of the plurality of cells 172. The training process of the learning network 222 is required for determining the mapping from the values 212 of the attributes or the vectorized representation to the formats 224. For convenience of description, the learning network 222 is referred to as a first learning network.

Herein, the learning network may also be referred to as "learning model," "neural network," or "neural network model." The terms "learning network," "neural network," "neural network model," "model," and "network" may be used interchangeably hereinafter. The learning network is configured to include one or more network layers, each of which includes one or more processing units (which are also referred to as neurons). Each processing unit processes its input based on parameters obtained from training, and generates its output. The output of a preceding layer is transmitted as input to a next layer for further processing. Parameters of all neurons of the learning network constitute a parameter set of the learning network. When the parameter set of the learning network is determined by training, the learning network may map the received input to the corresponding output, using the parameter set of the training. Therefore, the training process of the learning network may be considered as learning, from the training data, mapping from an input to an output. The last layer of the learning network is referred to as an output layer. Herein, outputs of respective layers preceding the output layer may be considered as feature representations of the input, and the output layer is used for mapping from the feature representations to the corresponding output.

In the implementations of the subject matter described herein, the first learning network 222 used by the format determination module 220 is trained to have the capability of executing mapping from the values 212 of the attributes of the data table 170 (i.e., the input, which may specifically be the corresponding vectorized representations) to the formats 224 of the respective cells in the data table (i.e., the output). In FIG. 2, the learning network 222 extracts the feature representations of the values of the input attributes and determines, based on the feature representations, the respective formats 224 of the plurality of cells 172.

For the task of auto-formatting of a data table, one challenge is the coupling between formats of the data table and the table structure. Users typically select formats based on their understanding on the table structure. However, since creation of a data table is with high flexibility, it is difficult to simply define a classification rule or use a certain language to systematically describe the exquisite table structure, such as the hierarchical table heads and the data layouts. Further, there are rich formats applicable to the data tables. Therefore, according to the implementations of the subject matter described herein, it is proposed to utilize a learning network to learn mapping from the whole attribute settings of a data table to the cell formats without explicitly modeling the table structure as the table structure information may be considered as being embedded implicitly in the underlying formats and may be implicitly taken into account during lay-by-layer feature extraction of the learning network.

Training data is required to train the first learning network 222 to learn the mapping from the attribute values to the formats of the cells. Sample data for training the learning network includes a set of sample data tables of which cells are set with corresponding formats. In other words, the mapping from the attribute settings of cells to the formats of the cells may be learned from a lot of formatted data tables. The sample data tables may be obtained from a variety of sources, such as web pages, databases, or the like. In some implementations, data tables with good formatting outcomes may be derived from reliable data sources or filtered manually, as the sample data tables. In some implementations, a part or all of cells in each of the sample tables are set with the corresponding formats. Since a sample data table has target formats, manual labeling for the training data can be omitted. With the known formats of the sample data table, various supervised training technologies can be employed to determine the parameter set of the first learning network.

During training of the first leaning network 222, specific values of corresponding attributes of the respective cells (for example, values of the attributes of one or more types as discussed above) may be derived from the sample data tables. The attributes of the sample data tables under the concern are the same as those to be obtained from the data table 170 to be formatted, including, for example, the length, types, proportions of different types of data, and/or the merging status of the cells. In addition, the formats for the respective cells may be determined from the sample data tables that have been formatted, and the determined formats may be of the same type as those to be determined for the cells in the data table 170.

The formats for the cells extracted from each of the set of sample data tables may be considered as ground-truth (or correct) formats of the data table. The training process of the first learning network 222 is to update continuously the parameter set of the network using the set of sample data tables, such that the formats predicted by the first leaning network 222 from the attribute values of the respective cells in the sample data tables are approximated or similar to the ground-truth formats presented in the set of sample data tables, i.e., the first learning network 222 can learn how to determine formats as similar as possible to those presented in ground-truth data tables. The specific architecture and the training process of the first learning network 222 will be described in detail below. The training of the first learning network 222 may be executed on the computing device 100, or on another device or device cluster.

In some implementations, the formats 224 of the respective cells 172 determined by the format determination module 220 may be provided to the format applying module 230. The format applying module 230 may apply the formats 224 indicated by the format determination module 220 to the respective cells 172 of the data table 170, so as to obtain a formatted data table 180. The formats may be applied by means of an application/tool for the electronic document in which the editable data table 170 is located. In some implementations, the formats 224 may also be output to an external device from the computing device 100, for example, a device on which the data table 170 is edited, so as to achieve formatting of the data table 170 on the device. In these implementations, the functionality of the format applying module 230 may be implemented at an external electronic device from the computing device 100.

As an example of some actual implementations, the whole data formatting module 122 or the format applying module 230 therein may be embedded into an end-user development application, such as a spreadsheet application or a word application, to provide automatic, fast formatting of a data table edited in the application.

In some implementations, the cells 172 in the data table 170 are not set with any one or more predetermined formats, for example, no border, no color filling, or the like. In some implementations, one or more cells 172 of the data table 170 may have been set with one or more formats. In these implementations, the formats 224 determined by the format determination module 220 may be replaced by the corresponding formats. For example, a cell 170 in the data table 170 is originally set with right alignment, while the format determination module 220 determines the data alignment of the cell 172 as center alignment. When formatting the data table, the data alignment of the cell 172 may be modified as center alignment. In some examples, the original format in the data table 170 may not be modified, and only the new format(s) determined by the format determination module 220 is added. The scope of the subject matter described herein is not limited in this regard.

Example Learning Network Structure

As mentioned above, the first learning network 222 may be implemented by various learning network architecture. In some implementations, the first learning network 222 may be implemented based on a conditional Generative Adversarial Network (cGAN). cGAN may learn mapping from an observed domain to a target domain, and specifically learn mapping from attribute settings of cells to formats of the data table in the subject matter described herein. Such mapping learning is supervised and conditional, i.e., the result of the network learning is to conform to the formats given by the sample data tables.

cGAN includes a generator part (represented as G) and a discriminator part (represented as D). In the task of formatting a data table herein, the generator part G is trained to map an input value of an attribute (which is represented as d) to a format of a data table (which is represented as f), and the generator part G therefore may form the first learning network 222. The training objective of the generator part G is to make the discriminator D that is under adversarial training can hardly or cannot differentiate a format predicted by the generator part G and the corresponding ground-truth format. The discriminator part D is trained in an adversarial way, with the objective of trying to differentiate the pair of the values of the attribute and the format {d, f} is true (i.e., the values of the attribute and the corresponding format of the cell obtained from the sample data table) or false (i.e., the input values of the attribute and the format predicted by the generator G). The discriminator D may have a network structure that is symmetrical to the generator part G. Hence, during the training, a cGAN target function (represented as $\mathcal{L}_{cGAN}(G, D)$) for obtaining the first learning network 222 may be based on a loss function, which is represented as follows:

$$\mathcal{L}_{cGAN}(G,D) = \mathbb{E}_{(d,f)}[\log D(d,f)] + \mathbb{E}_d[\log(1-D(d,G(d)))] \quad (1)$$

Since the training objectives of the generator part G and the discriminator part D are adversarial, according to the attribute values and formats for cells of the sample data tables, the training process of the first learning network 222 may be converged via the following minimum-maximum game to meet the training objectives:

$$\min_G \max_D \mathcal{L}_{cGAN}(G, D) \quad (2)$$

Equation (2) represents that during the training, the generator part G is trained to make the loss function $\mathcal{L}_{cGAN}(G, D)$ minimum while the discriminator part D is trained to make the loss function $\mathcal{L}_{cGAN}(G, D)$ maximum. It would be appreciated that the discriminator part D is mainly provided for the training of the generator part G. After the training is completed, the generator part G is used as the first learning network 222.

In some implementations, in order to learn better from the sample data tables during the training, a plurality of discriminator parts in different sizes may be used to assist in the training. Those discriminator parts are to differentiate true and false pairs of attribute values and formats for cells in different sizes. In an example, three discriminators may be employed, which are represented as $D_1$, $D_2$, and $D_3$, respectively, and the training objective of the first learning network 222 may be represented as follows:

$$\min_G \max_{D_1, D_2, D_3} \sum_{k=1,2,3} \mathcal{L}_{cGAN}(G, D_k) \quad (3)$$

Equation (3) indicates that each discriminator part of a different size tries every effort to differentiate the true and false pairs of attribute values and formats for the cells.

In view of the characteristics of rows and columns of a data table, attribute values of the cells in the data table may be regarded as information in a two-dimensional structure which is similar to a two-dimensional image. Hence, in some implementations, the first learning network 222 may be configured using a structure of a Convolutional Neural Network (CNN). For example, one or more network layers of the first learning network 222 may include convolutional layers, each of which includes one or more convolutional kernels (also referred to as convolutional filters) to perform a corresponding convolutional operation. In the example of cGAN, as the first learning network 222, the generator part G may be configured with a structure of a conventional neural network, and the discriminators D may be provided symmetrically.

Figure 3:
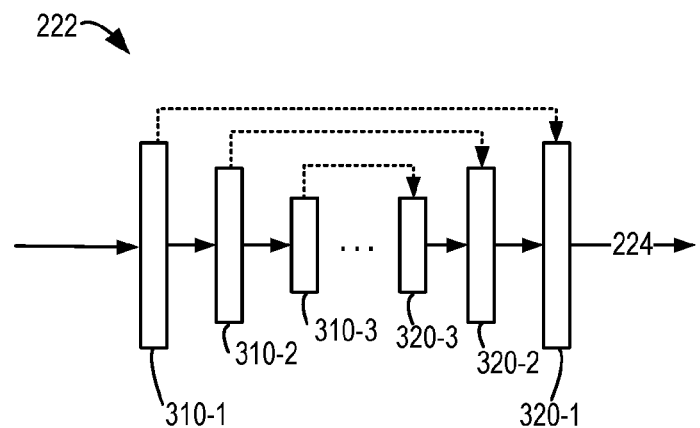
FIG. 3 illustrates a block diagram of an example learning network of FIG. 2 according to an implementation of the subject matter described herein.

In some implementations, the respective network layers of the first learning network 222 may be configured with "u-net" architecture, in order to save computing resources and increase the sample learning capability. FIG. 3 illustrates example architecture of the first learning network 222 with the "u-net" architecture. As shown in FIG. 3, the first learning network 222 includes a contraction path consisting of a plurality of network sections 310-1, 310-2, 310-3, and the like (collectively or individually referred to as network sections 310). In the contraction path, a network section 310 processes and downsamples an input, and a next network section 310 continues to process the downsampled feature representation extracted by the preceding network section 310 in a smaller size.

The first learning network 222 further includes an expansion path consisting of a plurality of network sections 320-1, 320-2, 320-3 and the like (collectively or individually referred to as network sections 320). In the expansion path, a network section 320 upsamples an input and executes corresponding processing, and a next network section 320 continues to process the feature representation extracted from the preceding network section 320 in a greater size. The first network section in the expansion path is connected with the last network section in the contraction path to receive an output of this section for processing. During usage of the first learning network 222, the first network section 310-1 extracts the values 212 of the attributes of the respective cells 172 in the data table 170, and the last network section 320-1 outputs the formats 224 of the respective cells in the data table 170.

It would be appreciated that although FIG. 3 illustrates a certain number of network sections 310 and a certain number of network sections 320, in other examples, the contraction path and the expansion path may include more or fewer network sections.

In some implementations, in order to enable the low-level feature representations extracted by preceding network sections to be used for more efficient output format generation, shortcut connections may be used to connect the network sections 310 and 320 in corresponding sizes in the contraction path and the expansion path of the first learning network 222. Still referring to FIG. 3, the output of the network section 310-1 is connected to the network section 320-1 to provide the output of the network section 310-1 directly to the network section 320 via this shortcut connection. Similarly, the network section 310-2 is connected with the network section 320-2; the network section 310-3 is connected with network section 320-3; and so on and so forth. Therefore, in addition to the feature representation provided by the preceding network section, a respective network section 320 in the expansion path also processes the feature representation provided by the network section 310 connected therewith. Of course, the two adjacent network sections in the contraction path and the expansion path have already a connection therebetween.

In some CNN-based implementations, each network section 310 may at least include a convolutional layer for performing a convolution operation and a downsampling layer for performing downsampling. Each network section 310 extracts a feature representation input to the section as an input to a next network section 310. In some CNN-based implementations, each network section 320 may include an upsampling layer for performing upsampling and a convolutional layer for performing a convolution operation. In some implementations, the downsampling layer in the network section 310 in the contraction path is connected with the upsampling layer in the network section 320 in the expansion path. Features of the attribute values at respective parts and respective levels may be explored through the feature extraction at multiple layers of different sizes. The feature representation extracted by each network section 310 may include one or more feature maps, each of which includes feature values arranged in rows and columns.

It would be appreciated that although FIG. 3 illustrates an example structure of the first learning network 222, the first learning network 222 may also be configured in other structure. The implementations of the subject matter described herein are not limited in this regard. Regardless of the structure of the first learning network 222, the first learning network 222 may be trained based on the sample data tables.

Row-Wise and Column-Wise Feature Extraction

Data in a data table are typically arranged in a row-wise or column-wise manner for easy lookup and query. Consequently, formats in the data table may also exhibit such row-level and column-level patterns. For example, all cells in a certain column of the data table may be of the same horizontal alignment, and all cells in a certain row may be of the same horizontal border. To extract such row-level and column-level patterns in a more effective way, in some examples, the first learning network 222 further extracts a row-wise feature representation and/or a column-wise feature representation. The row-wise feature representation indicates a row-wise distribution pattern of data of the data table, and the column-wise feature representation indicates a column-wise distribution pattern of data of the data table.

Figure 4:
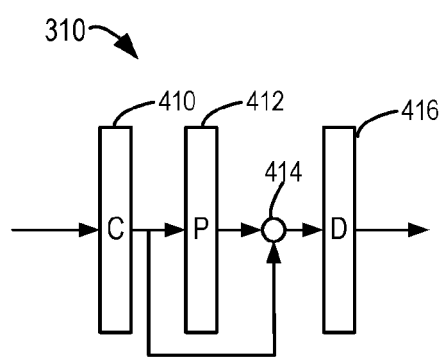
FIG. 4 illustrates a block diagram of an example network portion of the learning network of FIG. 3 according to an implementation of the subject matter described herein.

In some implementations, the extraction of the row-wise feature representation and/or the column-wise feature representation may be implemented in the respective network sections 310 of the first learning network 222. FIG. 4 illustrates an example of a network section 310. As shown in FIG. 4, the network section 310 includes a convolutional layer 410 (represented as C), a pooling layer 412 (represented as P), and a downsampling layer 416 (represented as D). The convolutional layer 410 performs a convolution operation on the input of the network section 310, to extract the corresponding feature representation as an output. It would be appreciated that the network layers shown in FIG. 4 are merely provided as an example, and in other examples, the network section 310 may also include a plurality of convolutional layers, a plurality of pooling layers or network layers for executing other processing. Depending on the location of the network section 310 in the first learning network 222, the convolutional layer 410 may extract the feature representation of the values 212 of the attributes of the respective cells 172 in the data table 170 (when it is located at the network section 310-1) or may extract the feature representation output by the preceding network section 310.

The pooling layer 412 in the network section 310 may be used to extract the row-wise feature representation and/or the column-wise feature representation. To differentiate from the row-wise/column-wise feature representations herein, the feature representation extracted by the convolutional layer 410 may be referred to as a global feature representation. The pooling layer 412 extracts, from the global feature representation, at least one of the row-wise feature representation or the column-wise feature representation. The row-wise and/or the column-wise feature representations extracted by the pooling layer 412 and the global feature representation extracted by the convolutional layer 410 are concatenated by a concatenation module 414 and then input to a downsampling layer 416 for downsampling. After the downsampling, the respective dimensions of the global feature representation and the row-wise and/or column-wise feature representations are reduced. The downsampling rate may be preconfigured.

Figure 5:
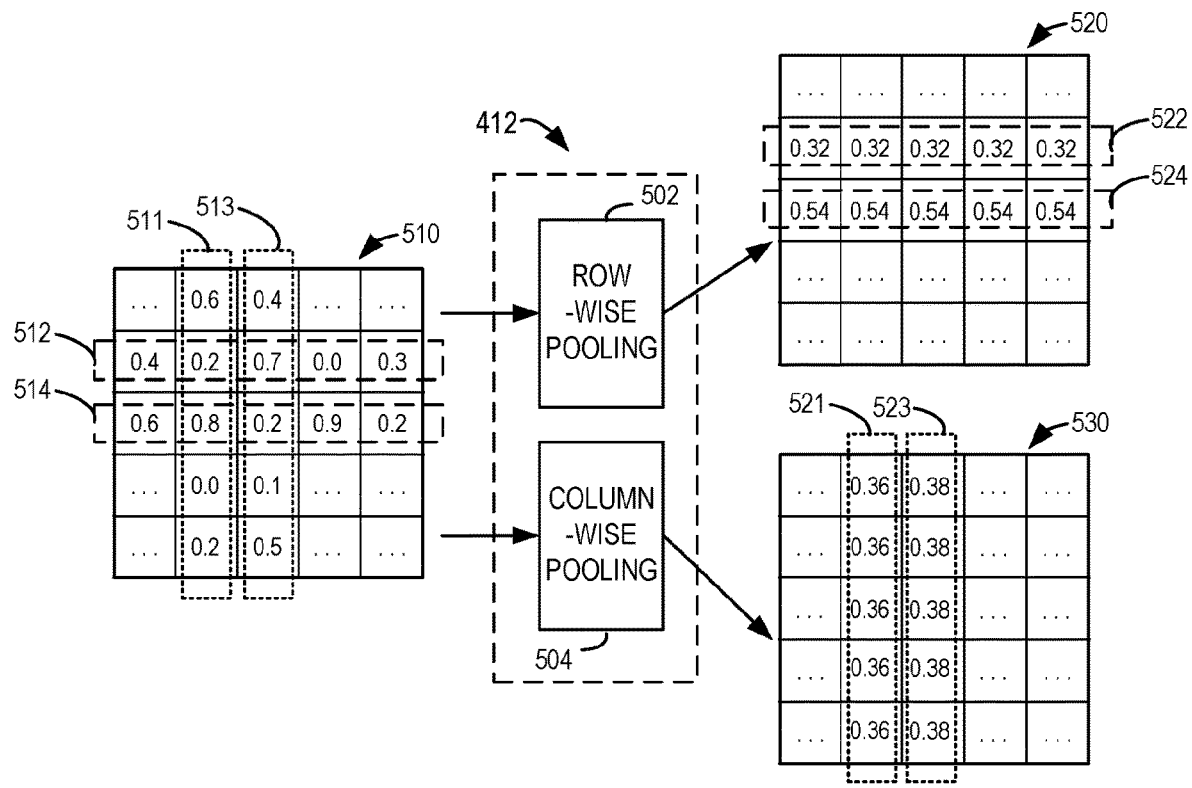
FIG. 5 illustrates a block diagram of an example pooling layer of FIG. 4 according to an implementation of the subject matter described herein.

The pooling layer 412 may include different modules/sections for extracting the row-wise and column-wise feature representations, respectively. FIG. 5 illustrates a specific structure of the pooling layer 412 and an example of extracting the row- and column-wise feature representations. As shown in FIG. 5, the pooling layer 412 may include a row-wise pooling section 502 and a column-wise pooling section 504.

FIG. 5 further illustrates a feature map 510 to be processed by the pooling layer 412, which may represent a global feature representation extracted by the convolutional layer 410 or a part thereof. Therefore, the feature map 510 may also be referred to as a global feature map. The row-wise pooling section 502 extracts a row-wise feature map 520 extracted from the global feature map 510. The row-wise feature map 520 may be regarded as a row-wise feature representation or a part of the row-wise feature representations (if the global feature representation to be processed includes a plurality of feature maps). The column-wise pooling section 504 extracts a column-wise feature map 530 from the feature map 510. The column-wise feature map 530 may be regarded as a column-wise feature map (if the global feature representation to be processed includes a single feature map) or a part of column-wise feature maps (if the global feature representation to be processed includes a plurality of feature maps).

Given that E represents the global feature map 510 input to the pooling layer 412 and h and w are height and width of the feature map 510, respectively, then $E \in \mathbb{R}^{h \times w}$. The row-wise pooling section 502 and the column-wise pooling section 504 may perform average pooling on the feature map 510 row by row and column by column, respectively, and spread the average pooling result over the whole row and the whole column, respectively. Then, the row-wise feature map 520 and the column-wise feature map 530 are of the same size as the global feature map 510. For example, the row-wise feature map 520 may be represented as $H \in \mathbb{R}^{h \times w}$, and the column-wise feature map 530 may be represented as $V \in \mathbb{R}^{h \times w}$.

For convenience of description, FIG. 5 illustrates partial feature values in the global feature map 510. Specifically, in extracting the row-wise feature representation, for each row of the global feature map 510, the row-wise pooling section 502 averages the feature values in the row to obtain an average row feature value, and spreads the average row feature value over the corresponding row of the row-wise feature map 520. As such, all the feature values in that corresponding column are identical. The row-wise average pooling performed by the row-wise pooling section 502 on the global feature map 510 may be represented as follows:

$$H = \frac{1}{w} \cdot E \cdot (1^{w \times w}) \quad (4)$$

where $1^{w \times w}$ represents a w×w matrix with all values being 1.

In the example as shown in FIG. 5, the row-wise pooling section 502 may average all the feature values in a row 512 of the global feature map 510, resulting in an average row feature value of 0.32, and the average row feature value of 0.32 is spread over the corresponding row 522 of the row-wise feature map 530 such that the row 522 has a plurality of identical feature values of 0.32. Similarly, the same average pooling may be performed for the row 514 of the global feature map 510, and a feature value of 0.54 in the corresponding row 524 of the row-wise feature map 530 may be determined accordingly. For other rows of the global feature map 510, similar processing may be performed to obtain the row-wise feature map 520.

In extracting the column-wise feature representation, for each column of the global feature map 510, the column-wise pooling section 504 averages the feature values in the column to obtain an average column feature value, and spreads the average column feature value over the corresponding column of the column-wise feature map 530. As such, all the feature values in the corresponding column are identical. The column-wise average pooling performed by the column-by-column section 504 on the global feature map 510 may be expressed as follows:

$$V = \frac{1}{h} \cdot (1^{h \times h}) \cdot E \quad (5)$$

where $1^{h \times h}$ represents a h×h matrix with all values being 1.

In the example shown in FIG. 5, the column-wise pooling section 504 may average all the feature values in a column 511 of the global feature map 510, resulting in an average column feature value of 0.36, and the average column feature value of 0.36 is spread over the corresponding column 521 of the column-wise feature map 530 such that the column 521 has a plurality of identical feature values of 0.36. Similarly, the same average pooling may be performed for the column 513 of the global feature map 510, and a feature value of 0.38 in the corresponding column 523 of the column-wise feature map 530 may be determined accordingly. Similar processing may be performed on other columns of the global feature map 510 to obtain the column-wise feature map 530.

It would be appreciated that depending on the output of the convolutional layer 410, the pooling layer 412 may process a plurality of feature maps of the global feature map, to respectively extract the corresponding row-wise feature maps and column-wise feature maps, as the row-wise feature representation and the column-wise feature representation. It is to be understood that the sizes of the feature maps 510, 520, and 530 as shown in FIG. 5 and the feature values contained therein are provided only as an example. The pooling layer 412 may process any other feature maps.

In some implementations, the plurality of network sections 310 of the first learning network 222 each may include structures as shown in FIGS. 4 and 5 for extracting feature representations. Hence, for the values 212 of the input attributes, the plurality of network sections 310 execute iteratively to extract the feature representations. Specifically, in the first network section 310-1, the convolutional layer 410 extracts a global feature representation from the values 212 of the attributes, the pooling layer 412 extracts a row-wise feature representation and/or a column-wise feature representation from the global feature representation, and then the global feature representation and the row-wise feature representation and/or the column-wise feature representation are concatenated to obtain a hybrid feature representation. For example, in the example of FIG. 5, the feature maps 510, 520, and 530 may be concatenated to form a hybrid feature representation. The hybrid feature representation is further processed, for example, is downsampled by the downsampling layer 416.

In the following network section 310-2, the convolution layer 410 extracts a new global feature representation from the hybrid feature representation output by the preceding network section 310-2; the pooling layer 412 continues to perform average pooling based on the new global feature representation, to obtain a new row-wise feature representation and/or a new column-wise feature representation; and the downsampling layer 416 performs the downsampling operation similarly. As a result, the row-wise feature representations and/or the column-wise feature representations may be extracted at different size levels. Through the row-wise and column-wise pooling, the subsequent convolutional layers may directly inherit the row-wise and the column-wise features, without being limited by the sizes of the convolutional kernels.

It would be appreciated that in some implementations, one or some network sections 310 in the contraction path of the first learning network 222 may be deployed with the pooling layer 412, and in some other implementations, all network sections 310 of the first learning network 222 may be deployed with the pooling layer 412. After the feature extraction, the feature representation extracted by the last network section 310 in the contraction path is provided to the network section 320 in the expansion path for further processing. As mentioned above, each network section 320 may include an upsampling layer and a convolutional layer. Upon layer-by-layer processing by a plurality of network sections 320, the final feature representation of the values 212 of the attributes may be determined, such that the last output layer may determine the formats 224 of the respective cells in the data table 170 based on the final feature representation.

Local Refinement Network

Viewers are very sensitive to local patterns in data table formats, especially to important table regions such as the hierarchical headers. Moreover, sometimes even a single cell having an inconsistent format with adjacent cells may be obtrusive, such as an outlier cell in the header region or a cell with different alignment in a column. Such inconsistency may possibly destroy the final effect of data table formatting. In order to prevent the undesirable errors, in some implementations, in determining the formats for the cells 172, the format determination module 220 may ensure, as much as possible, format consistency of a plurality of cells in a row and/or column of the data table 170.

Specifically, respective coarse formats for a plurality of cells may be determined based on the feature representations extracted from the values 212 of the attributes. For example, the formats determined by the first learning network 222 as described above may be regarded as coarse formats, rather than the final formats. Then, the format determination module 220 may extract a joint feature representation from the values 212 of the attributes and the coarse formats for the cells 172, and determine respective final formats for the plurality of cells 172 based on the joint feature representation, such that a plurality of cells 172 in a same row and/or a same column of the data table 170 may have the identical/consistent formats as much as possible. It may ensure consistency at a row level and a column level and remove or eliminate outlier cells, thereby enhancing the visual presentation effect. Of course, the row-wise and column-wise consistency does not necessarily mean that all cells 172 in a same row or a same column have the identical formats. In some cases, parts of the cells 172 in the same row or the same column have consistent formats. For respective cells 172 in each row or column, when determining the corresponding formats, other factors learned by the first learning network 222 are taken into account in addition to the constraint of ensuring the format consistency.

Figure 6:
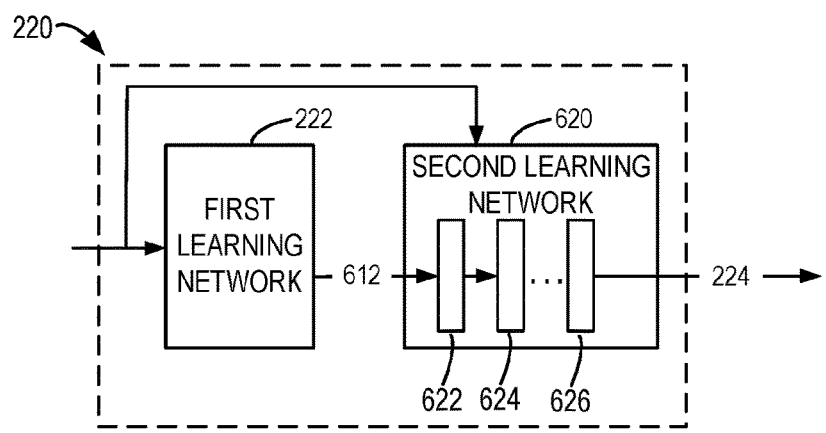
FIG. 6 illustrates a block diagram of a format determination module of FIG. 2 according to another implementation of the subject matter described herein.

In some implementations, the row-wise and/or column-wise format consistency constraints may also be implemented based on a learning network. FIG. 6 illustrates such implementation. As shown in FIG. 6, in addition to the first learning network 222, the format determination module 220 includes a further learning network 620 (referred to as a second learning network). The first learning network 222 extracts the feature representation of the input values 212 of attributes and determines the coarse formats 612 for the respective cells 172 in the data table 170 based on the feature representation. The second learning network 620 determines the final formats 224 for the respective cells 172 based on the values 212 of the attributes and the coarse formats 612. The second learning network 620 performs coarse-to-fine refinement on the formats for the cells, in order to remove the local abnormal formatting results.

Specifically, the second learning network 620 extracts a joint feature representation from the values 212 of the attributes and the coarse formats 612, and maps the joint feature representation to the respective formats 224 for the plurality of cells. The second learning network 620 may include a plurality of network layers 622, 624, 626, and the like. In some implementations, the network layers of the second learning network 620 may include a full-connected layer. In some implementations, the second learning network 620 may include a network layer(s) for extracting a row-wise feature representation and/or a column-wise feature representation, which is similar to the pooling layer 412 as described above. In an example, a first network layer of the second learning network 620, for example, the network layer 622, may be designed to extract a row-wise feature representation and/or a column-wise feature representation from the input (including the values 212 of the attributes and the coarse formats 612). The row-wise feature representation and/or the column-wise feature representation determined by the network layer 622 are concatenated with the input of the network layer 622 to be provided to a next network layer 624 for further processing. The outputs of the network layers in the second learning network 620 (except the last output layer) may be regarded as the extracted joint feature representation.

In some implementations, the format consistency constraint to be satisfied by the second learning network 620 may be achieved through constraints on the model training. The training data for training the second learning network 620 may include a set of sample data tables, and cells in the sample data tables are set with corresponding formats. In some implementations, the sample data tables for training the second learning network 620 are the same as those for training the first learning network 222. In some implementations, end-to-end supervised training may be performed for the first learning network 222 and the second learning network 620. During training the second learning network 620, a data augmentation strategy may be employed to randomly add some incorrect format patterns to the formats obtained from the sample data tables for training. The second learning network 620 may keep learning based on such training data, thereby ensuring consistency of cell formats in rows and/or columns of a data table.

When training the second learning network 620, a loss function may be constructed based on the consistency losses. Different pattern types may require consistency in different directions. As an example, a horizontal border may require row-wise consistency, and a vertical border may require column-wise consistency in cells. As another example, the vertical alignment (top alignment, vertical centering, and bottom alignment) may care more about consistency of row-wise cells, while for the horizontal alignment (including left alignment, center alignment, and right alignment), consistency between column-wise cells may be of more importance.

Depending on consistency requirements in different directions, the types of the formats to be determined by the format determination module 220 are divided into a first category of row-wise consistency (represented as $Cont_{row}$) and a second category of column-wise consistency (represented as $Cont_{col}$). The first category may include one or more format types requiring the row-wise consistency, such as the horizontal border, the vertical alignment, and the like, and the second category may include one or more format types requiring the column-wise consistency, such as the vertical border, the horizontal alignment, and the like.

If row-wise local refinement is performed, the second learning network 620 is trained to meet an objective (referred to as a first objective) of having row-wise consistency in a first set of predicted formats that are determined for adjacent cells in a corresponding row of the set of sample data tables using the second learning network 620, and more specifically, having differences between the first set of predicted formats less than a first threshold. The first set of predicted formats includes formats predicted for respective adjacent cells, and those formats are of a first format type with row-wise consistency. The first objective is provided for constraining the format consistency in the row-wise cells. The first threshold may be any value set as required or from experience, so as to limit the differences to a smaller range.

If column-wise local refinement is performed, the second learning network 620 is trained to meet an objective (referred to as a second objective) of having column-wise consistency in a second set of predicted formats that are determined for adjacent cells in a corresponding column of the set of sample data tables using the second learning network 620, and more specifically, having differences between the second set of predicted formats less than a second threshold. The second set of predicted formats includes formats predicted for respective adjacent cells, and those formats are of a second format type with column-wise consistency. The second objective is provided for constraining the format consistency in the column-wise cells. The second threshold may be any value set as required or from experience, so as to limit the differences to a smaller range.

By considering the above first and second objectives, the loss function of the second learning network 620 may be determined based on the consistency losses, which is represented as follows:

$$\mathcal{L}_{discon} = \sum_{c \in Cont_{row}, i, j} |f_{c,i,j} - f_{c,i,j+s}| + \sum_{c \in Cont_{col}, i, j} |f_{c,i,j} - f_{c,i+s,j}|, \quad (6)$$

where $f_{c,i,j}$ represents a predicted format determined by the second learning network 620 for the (i, j)-th cell in a certain sample data table, which is from a category c (which may be the first category $Cont_{row}$ or the second category $Cont_{col}$); and s represents a step size that defines neighborhood relations in the corresponding row or column.

In Equation (6), the first item at the right side represents the row-wise consistency, to cause smaller differences in the category $Cont_{row}$ applied to adjacent cells in each row; the second item at the right side represents the column-wise consistency. If only the row-wise consistency or the column-wise consistency is under the concern, the item corresponding to the other direction may be omitted from Equation (6). In an example, the step size s may be set to 1, indicating format consistency of immediately adjacent cells in the row and column directions. The step size s may also be valued to an integer greater than 1, for example, 2, 3, 4, 5 m or the like, indicating format consistency of adjacent cells with a certain interval in the row and column directions. In some implementations, the loss function based on the consistency losses may include a sum of row-wise and column-wise consistency losses with a plurality of different step sizes.

During the end-to-en training, the total loss function of the first learning network 222 and the second learning network 620 may be expressed as follows:

$$\min_G \left( \left( \max_{D_1, D_2, D_3} \sum_{k=1,2,3} \mathcal{L}_{cGAN}(G, D_k) \right) + \lambda \mathcal{L}_{discon} \right) \quad (7)$$

The loss function considered in Equation (7) is for the case when discriminator parts of different sizes are used to train the first learning network 222. It would be appreciated that other loss functions of the first learning network 222 may also be used, together with the loss function of the second learning network 620, to form a total loss function for end-to-end training. It can be seen from Equation (7) that for the cGAN-based training architecture, it is expected to maximize the loss function related to the discriminator parts but minimize the loss functions related to the generator part and the second learning network. In Equation (7), λ controls the importance levels of the loss functions corresponding to the first learning network 222 and the second learning network 620, which may be valued from 0 to 1.

Controllable Data Table Formatting

In some implementations, it is also desired that one or more aspects of auto-formatting of a data table are controllable in a manual fashion by users or in a certain automatic fashion, which can further diversify the formatting results. In such implementations, in determining the formats for the respective cells in the data table 170, in addition to the feature representation extracted from the values 212 of the attributes, the format determination module 220 in FIG. 2 may obtain a control indication related to a format of a predetermined type. The control indication may be indicated by a user or determined randomly. The format determination module 220 uses the control indication as a reference when determining the formats. In some implementations, the format determined for each of the cells can satisfy the specific definition of the control indication.

The control indication may define at least one of the following: presence or absence of the format of the predetermined type, or at least one parameter value for the format of the predetermined type. The parameter value(s) may include, for example, a proportion of the format in the whole data table, a certain region to which the format is applied, a specific value within an adjustable range, or the like. For example, the control indication may indicate presence or absence of a format with a variable, or a specific parameter value in the case of presence of the format. As an example, a border density for a border format in the data table 170 may be defined by the control indication. The border density may be determined by a proportion of a number of cells in the whole data table to which the border is applied. In an example related to color filling, the control indication may define a selected color for filling when it is determined to apply color filling to a certain cell or cells.

Since the format determination module 220 is implemented based on the learning networks, for example, the first learning network 222 and possibly the second learning network 620, a variable (represented as z) corresponding to the control indication may be provided as an input to a learning network in the format determination module 220, for example, the first learning network 222. The variable z may be valued correspondingly to indicate presence or absence of a corresponding format or a corresponding parameter value. The control indication may be selected randomly or controlled by the user. If it is desired to control that a format(s) of a type(s) not to be used, an additional corresponding variable(s) may be added as the input.

During the training of the learning networks 122 and 620 used in the format determination module 220, it is to determine whether the format of the predetermined type is present in the sample data tables and the corresponding attributes. In order to augment the sample data, the formats in the sample data tables may be adjusted with respect to a certain target control indication. For example, for a target control indication indicating a border density, the borders of cells in the sample data tables may be adjusted to meet the indicated border density. Then, the adjusted sample data tables may be used as training data for training the learning networks 122 and 620, such that the border density of the entire data table determined by the learning networks 122 and 620 meets the target border density.

By using different control indications (for example, different values of the variable z) instructed or selected randomly by the users, different results (for example, different formats of the data table 170) can be output in the same condition (for example, the same data table 170 to be formatted). Different formats output for the same data table 170 may be provided to the users as recommendations, to allow the users to select a desired formatting result from the recommendations. Alternatively, or in addition, the users may control the formatting of the data table 170 by providing different control indications and thus obtain the desired result.

EXAMPLE PROCESS

Figure 7:
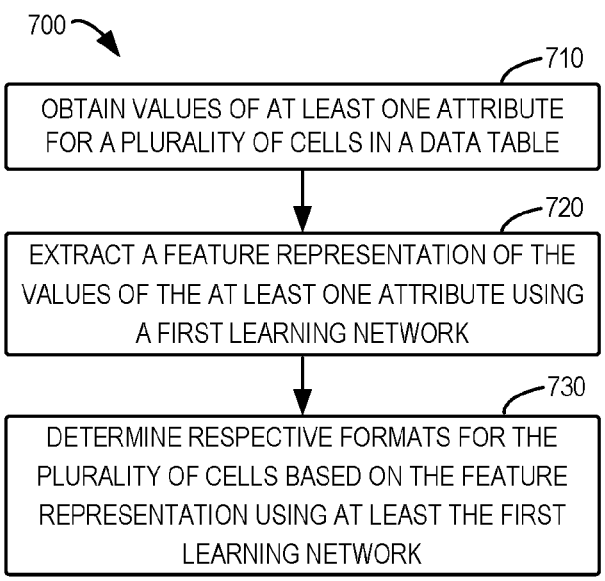
FIG. 7 illustrates a flowchart of a process according to an implementation of the subject matter described herein.

FIG. 7 illustrates a flowchart of a process 700 according to some implementations of the subject matter described herein. The process 700 can be implemented by the computing device 100, for example, by the data formatting module 122 in the memory 120 of the computing device 100.

At block 710, values of at least one attribute for a plurality of cells in a data table are obtained, the values of the at least one attribute indicating at least one of a semantic meaning of data filled in the plurality of cells or a structure of the data table. The plurality of cells are arranged in rows and columns in the data table. At block 720, a feature representation of the values of the at least one attribute is extracted using a first learning network. At block 730, respective formats for the plurality of cells are determined based on the feature representation using at least the first learning network.

In some implementations, extracting the feature representation comprises: mapping the values of the at least one attribute to a corresponding vectorized representation; extracting a global feature representation from the vectorized representation; and determining the feature representation based on the global feature representation.

In some implementations, determining the feature representation comprises: extracting, from the global feature representation, at least one of a row-wise feature representation or a column-wise feature representation, the row-wise feature representation and the column-wise feature representation indicating distribution patterns in a row direction and a column direction of the data table, respectively; concatenating the global feature representation with the extracted at least one of the row-wise feature representation or the column-wise feature representation, to obtain a hybrid feature representation; and determining the feature representation based on the hybrid feature representation.

In some implementations, the global feature representation and the row-wise feature representation comprise feature values arranged in rows and columns, and extracting the row-wise feature representation comprises: for each of the rows of the global feature representation, averaging feature values in the row to obtain an average row feature value; and spreading the average row feature value over a corresponding row of the row-wise feature representation.

In some implementations, the global feature representation and the column-wise feature representation comprise feature values arranged in rows and columns, and extracting the column-wise feature representation comprises: for each of the columns of the global feature representation, averaging feature values in the column to obtain an average column feature value; and spreading the average column feature value over a corresponding column of the column-wise feature representation.

In some implementations, determining the respective formats for the plurality of cells based on the feature representation comprises: determining respective coarse formats for the plurality of cells based on the feature representation using the first learning network; extracting a joint feature representation from the values of the at least one attribute and the coarse formats; and determining the respective formats for the plurality of cells based on the joint feature representation, such that a plurality of cells in at least one of a same row or a same column of the data table have a same format.

In some implementations, extracting the joint feature representation comprises: extracting the joint feature representation from the values of the at least one attribute and the coarse formats using a second learning network, the second learning network having been trained based on a set of sample data tables, cells in the set of sample data tables being set with corresponding formats.

In some implementations, the second learning network is trained to meet at least one of the following objectives: a first objective of having row-wise consistency in a first set of predicted formats that are determined for adjacent cells in a corresponding row of the set of sample data tables using the second learning network, or a second objective of having column-wise consistency in a second set of predicted formats that are determined for adjacent cells in a corresponding column in the set of sample data tables using the second learning network.

In some implementations, the first objective is to have differences between the first set of predicted formats that are determined for the adjacent cells in the corresponding row of the set of sample data tables to be less than a first threshold, and the first set of predicted formats are of a first format type with row-wise consistency. In some implementations, the second objective is to have differences between the second set of predicted formats that are determined for the adjacent cells in the corresponding column of the set of sample data tables to be less than a second threshold, and the second set of predicted formats are of a second format type with column-wise consistency.

In some implementations, determining the respective formats for the plurality of cells further comprises: obtaining a control indication related to a format of a predetermined type, the control indication defining at least one of the following: presence or absence of the format of the predetermined type, or at least one parameter value for the format of the predetermined type; and determining the respective formats for the plurality of cells further based on the control indication.

In some implementations, for a given cell of the plurality of cells, the at least one attribute comprises at least one of the following: data filled in the given cell, a length of the data filled in the given cell, a type of the data filled in the given cell, proportions of different types of data filled in the given cell, a formula for generating the data filled in the given cell, or a merging status of the given cell, the merging status indicating whether the given cell is merged with a further cell to present the data or indicating a merging manner pattern with the further cell.

In some implementations, the first learning network is trained based on a set of sample data tables, cells in the set of sample data tables being set with corresponding formats.

In some implementations, the first learning network comprises a generator part of a conditional Generative Adversarial Network (cGAN).

Example Implementations

Some example implementations of the subject matter described herein are listed below.

In an aspect, the subject matter described herein provides a computer-implemented method. The method comprises obtaining values of at least one attribute for a plurality of cells in a data table, the values of the at least one attribute indicating at least one of a semantic meaning of data filled in the plurality of cells or a structure of the data table, the plurality of cells being arranged in rows and columns in the data table; extracting a feature representation of the values of the at least one attribute using a first learning network; and determining respective formats for the plurality of cells based on the feature representation using at least the first learning network.

In some implementations, extracting the feature representation comprises: mapping the values of the at least one attribute to a corresponding vectorized representation; extracting a global feature representation from the vectorized representation; and determining the feature representation based on the global feature representation.

In some implementations, determining the feature representation comprises: extracting, from the global feature representation, at least one of a row-wise feature representation or a column-wise feature representation, the row-wise feature representation and the column-wise feature representation indicating distribution patterns in a row direction and a column direction of the data table, respectively; concatenating the global feature representation with the extracted at least one of the row-wise feature representation or the column-wise feature representation, to obtain a hybrid feature representation; and determining the feature representation based on the hybrid feature representation.

In some implementations, the global feature representation and the row-wise feature representation comprise feature values arranged in rows and columns, and extracting the row-wise feature representation comprises: for each of the rows of the global feature representation, averaging feature values in the row to obtain an average row feature value; and spreading the average row feature value over a corresponding row of the row-wise feature representation.

In some implementations, the global feature representation and the column-wise feature representation comprise feature values arranged in rows and columns, and extracting the column-wise feature representation comprises: for each of the columns of the global feature representation, averaging feature values in the column to obtain an average column feature value; and spreading the average column feature value over a corresponding column of the column-wise feature representation.

In some implementations, determining the respective formats for the plurality of cells based on the feature representation comprises: determining respective coarse formats for the plurality of cells based on the feature representation using the first learning network; extracting a joint feature representation from the values of the at least one attribute and the coarse formats; and determining the respective formats for the plurality of cells based on the joint feature representation, such that a plurality of cells in at least one of a same row or a same column of the data table have a same format.

In some implementations, extracting the joint feature representation comprises: extracting the joint feature representation from the values of the at least one attribute and the coarse formats using a second learning network, the second learning network having been trained based on a set of sample data tables, cells in the set of sample data tables being set with corresponding formats.

In some implementations, the second learning network is trained to meet at least one of the following objectives: a first objective of having row-wise consistency in a first set of predicted formats that are determined for adjacent cells in a corresponding row of the set of sample data tables using the second learning network, or a second objective of having column-wise consistency in a second set of predicted formats that are determined for adjacent cells in a corresponding column in the set of sample data tables using the second learning network.

In some implementations, the first objective is to have differences between the first set of predicted formats that are determined for the adjacent cells in the corresponding row of the set of sample data tables to be less than a first threshold, and the first set of predicted formats are of a first format type with row-wise consistency. In some implementations, the second objective is to have differences between the second set of predicted formats that are determined for the adjacent cells in the corresponding column of the set of sample data tables to be less than a second threshold, and the second set of predicted formats are of a second format type with column-wise consistency.

In some implementations, determining the respective formats for the plurality of cells further comprises: obtaining a control indication related to a format of a predetermined type, the control indication defining at least one of the following: presence or absence of the format of the predetermined type, or at least one parameter value for the format of the predetermined type; and determining the respective formats for the plurality of cells further based on the control indication.

In some implementations, for a given cell of the plurality of cells, the at least one attribute comprises at least one of the following: data filled in the given cell, a length of the data filled in the given cell, a type of the data filled in the given cell, proportions of different types of data filled in the given cell, a formula for generating the data filled in the given cell, or a merging status of the given cell, the merging status indicating whether the given cell is merged with a further cell to present the data or indicating a merging manner pattern with the further cell.

In some implementations, the first learning network is trained based on a set of sample data tables, cells in the set of sample data tables being set with corresponding formats. In some implementations, the first learning network comprises a generator part of a conditional Generative Adversarial Network (cGAN).

In another aspect, the subject matter described herein provides an electronic device. The electronic device comprises a processing unit; and a memory coupled to the processing unit and having instructions stored thereon, the instructions, when executed by the processing unit, causing the device to perform acts of: obtaining values of at least one attribute for a plurality of cells in a data table, the values of the at least one attribute indicating at least one of a semantic meaning of data filled in the plurality of cells or a structure of the data table, the plurality of cells being arranged in rows and columns in the data table; extracting a feature representation of the values of the at least one attribute using a first learning network; and determining respective formats for the plurality of cells based on the feature representation using at least the first learning network.

In some implementations, extracting the feature representation comprises: mapping the values of the at least one attribute to a corresponding vectorized representation; extracting a global feature representation from the vectorized representation; and determining the feature representation based on the global feature representation.

In some implementations, determining the feature representation comprises: extracting, from the global feature representation, at least one of a row-wise feature representation or a column-wise feature representation, the row-wise feature representation and the column-wise feature representation indicating distribution patterns in a row direction and a column direction of the data table, respectively; concatenating the global feature representation with the extracted at least one of the row-wise feature representation or the column-wise feature representation, to obtain a hybrid feature representation; and determining the feature representation based on the hybrid feature representation.

In some implementations, the global feature representation and the row-wise feature representation comprise feature values arranged in rows and columns, and extracting the row-wise feature representation comprises: for each of the rows of the global feature representation, averaging feature values in the row to obtain an average row feature value; and spreading the average row feature value over a corresponding row of the row-wise feature representation.

In some implementations, the global feature representation and the column-wise feature representation comprise feature values arranged in rows and columns, and extracting the column-wise feature representation comprises: for each of the columns of the global feature representation, averaging feature values in the column to obtain an average column feature value; and spreading the average column feature value over a corresponding column of the column-wise feature representation.

In some implementations, determining the respective formats for the plurality of cells based on the feature representation comprises: determining respective coarse formats for the plurality of cells based on the feature representation using the first learning network; extracting a joint feature representation from the values of the at least one attribute and the coarse formats; and determining the respective formats for the plurality of cells based on the joint feature representation, such that a plurality of cells in at least one of a same row or a same column of the data table have a same format.

In some implementations, extracting the joint feature representation comprises: extracting the joint feature representation from the values of the at least one attribute and the coarse formats using a second learning network, the second learning network having been trained based on a set of sample data tables, cells in the set of sample data tables being set with corresponding formats.

In some implementations, the second learning network is trained to meet at least one of the following objectives: a first objective of having row-wise consistency in a first set of predicted formats that are determined for adjacent cells in a corresponding row of the set of sample data tables using the second learning network, or a second objective of having column-wise consistency in a second set of predicted formats that are determined for adjacent cells in a corresponding column in the set of sample data tables using the second learning network.

In some implementations, the first objective is to have differences between the first set of predicted formats that are determined for the adjacent cells in the corresponding row of the set of sample data tables to be less than a first threshold, and the first set of predicted formats are of a first format type with row-wise consistency. In some implementations, the second objective is to have differences between the second set of predicted formats that are determined for the adjacent cells in the corresponding column of the set of sample data tables to be less than a second threshold, and the second set of predicted formats are of a second format type with column-wise consistency.

In some implementations, determining the respective formats for the plurality of cells further comprises: obtaining a control indication related to a format of a predetermined type, the control indication defining at least one of the following: presence or absence of the format of the predetermined type, or at least one parameter value for the format of the predetermined type; and determining the respective formats for the plurality of cells further based on the control indication.

In some implementations, for a given cell of the plurality of cells, the at least one attribute comprises at least one of the following: data filled in the given cell, a length of the data filled in the given cell, a type of the data filled in the given cell, proportions of different types of data filled in the given cell, a formula for generating the data filled in the given cell, or a merging status of the given cell, the merging status indicating whether the given cell is merged with a further cell to present the data or indicating a merging manner pattern with the further cell.

In some implementations, the first learning network is trained based on a set of sample data tables, cells in the set of sample data tables being set with corresponding formats. In some implementations, the first learning network comprises a generator part of a conditional Generative Adversarial Network (cGAN).

In a further aspect, the subject matter described herein provides a computer program product which is tangibly stored on a non-transient computer storage medium and comprises machine-executable instructions which, when executed by a device, cause a device to: obtain values of at least one attribute for a plurality of cells in a data table, the values of the at least one attribute indicating at least one of a semantic meaning of data filled in the plurality of cells or a structure of the data table, the plurality of cells being arranged in rows and columns in the data table; extract a feature representation of the values of the at least one attribute using a first learning network; and determine respective formats for the plurality of cells based on the feature representation using at least the first learning network.

In some implementations, the machine-executable instructions, when executed by the device, cause the device to: map the values of the at least one attribute to a corresponding vectorized representation; extract a global feature representation from the vectorized representation; and determine the feature representation based on the global feature representation.

In some implementations, the machine-executable instructions, when executed by the device, cause the device to: extract, from the global feature representation, at least one of a row-wise feature representation or a column-wise feature representation, the row-wise feature representation and the column-wise feature representation indicating distribution patterns in a row direction and a column direction of the data table, respectively; concatenate the global feature representation with the extracted at least one of the row-wise feature representation or the column-wise feature representation, to obtain a hybrid feature representation; and determine the feature representation based on the hybrid feature representation.

In some implementations, the global feature representation and the row-wise feature representation comprise feature values arranged in rows and columns, and the machine-executable instructions, when executed by the device, cause the device to: for each of the rows of the global feature representation, average feature values in the row to obtain an average row feature value; and spread the average row feature value over a corresponding row of the row-wise feature representation.

In some implementations, the global feature representation and the column-wise feature representation comprise feature values arranged in rows and columns, and the machine-executable instructions, when executed by the device, cause the device to: for each of the columns of the global feature representation, average feature values in the column to obtain an average column feature value; and spread the average column feature value over a corresponding column of the column-wise feature representation.

In some implementations, the machine-executable instructions, when executed by the device, cause the device to: determine respective coarse formats for the plurality of cells based on the feature representation using the first learning network; extract a joint feature representation from the values of the at least one attribute and the coarse formats; and determine the respective formats for the plurality of cells based on the joint feature representation, such that a plurality of cells in at least one of a same row or a same column of the data table have a same format.

In some implementations, the machine-executable instructions, when executed by the device, cause the device to: extract the joint feature representation from the values of the at least one attribute and the coarse formats using a second learning network, the second learning network having been trained based on a set of sample data tables, cells in the set of sample data tables being set with corresponding formats.

In some implementations, the second learning network is trained to meet at least one of the following objectives: a first objective of having row-wise consistency in a first set of predicted formats that are determined for adjacent cells in a corresponding row of the set of sample data tables using the second learning network, or a second objective of having column-wise consistency in a second set of predicted formats that are determined for adjacent cells in a corresponding column in the set of sample data tables using the second learning network.

In some implementations, the first objective is to have differences between the first set of predicted formats that are determined for the adjacent cells in the corresponding row of the set of sample data tables to be less than a first threshold, and the first set of predicted formats are of a first format type with row-wise consistency. In some implementations, the second objective is to have differences between the second set of predicted formats that are determined for the adjacent cells in the corresponding column of the set of sample data tables to be less than a second threshold, and the second set of predicted formats are of a second format type with column-wise consistency.

In some implementations, the machine-executable instructions, when executed by the device, cause the device to: obtain a control indication related to a format of a predetermined type, the control indication defining at least one of the following: presence or absence of the format of the predetermined type, or at least one parameter value for the format of the predetermined type; and determine the respective formats for the plurality of cells further based on the control indication.

In some implementations, for a given cell of the plurality of cells, the at least one attribute comprises at least one of the following: data filled in the given cell, a length of the data filled in the given cell, a type of the data filled in the given cell, proportions of different types of data filled in the given cell, a formula for generating the data filled in the given cell, or a merging status of the given cell, the merging status indicating whether the given cell is merged with a further cell to present the data or indicating a merging manner pattern with the further cell.

In some implementations, the first learning network is trained based on a set of sample data tables, cells in the set of sample data tables being set with corresponding formats. In some implementations, the first learning network comprises a generator part of a conditional Generative Adversarial Network (cGAN).

In still a further aspect, the subject matter described herein provides a computer readable medium having machine-executable instructions stored thereon, the machine-executable instructions, when executed by a device, causing a device to perform the method according to the above aspect.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method of automatically reformatting a data table for improved visual presentation of the data table, comprising:
using one or more processors:
obtaining values of at least one attribute for a plurality of cells in the data table, the values of the at least one attribute indicating at least one of a semantic meaning of data filled in the plurality of cells or a structure of the data table, the plurality of cells being arranged in rows and columns in the data table;
extracting a feature representation of the values of the at least one attribute using a first learning network by:
mapping the values of the at least one attribute to a corresponding vectorized representation;
extracting a global feature representation from the vectorized representation;
extracting, within the first learning network and from the global feature representation, a row-wise or column-wise feature representation, the row-wise or column-wise feature representation capturing specific distribution patterns in row or column directions; and
obtaining a hybrid feature representation based upon a concatenation of the row-wise or column-wise feature representation to the global feature representation;
determining respective formats for the plurality of cells based on the hybrid feature representation using at least the first learning network;
adjusting the respective formats based upon a plurality of different target control indications to create a plurality of formats;
previewing, to a user, one or more of the plurality of formats in a graphical user interface (GUI) by displaying the data table adjusted according to one or more of the plurality of formats, the GUI allowing the user to select one of the plurality of formats;
receiving a selection of one of the plurality of formats; and
causing the data table to be displayed to the user in the selected format.

2. The method of claim 1, wherein the global feature representation and the row-wise feature representation comprise feature values arranged in rows and columns, and extracting the row-wise feature representation comprises: for each of the rows of the global feature representation, averaging feature values in the row to obtain an average row feature value; and spreading the average row feature value over a corresponding row of the row-wise feature representation.

3. The method of claim 1, wherein the global feature representation and the column-wise feature representation comprise feature values arranged in rows and columns, and extracting the column-wise feature representation comprises: or each of the columns of the global feature representation, averaging feature values in the column to obtain an average column feature value; and spreading the average column feature value over a corresponding column of the column-wise feature representation.

4. The method of claim 1, wherein determining the respective formats for the plurality of cells based on the hybrid feature representation comprises:

determining respective coarse formats for the plurality of cells based on the feature representation using the first learning network;

extracting a joint feature representation from the values of the at least one attribute and the coarse formats; and determining the respective formats for the plurality of cells based on the joint feature representation, such that a plurality of cells in at least one of a same row or a same column of the data table have a same format.

5. The method of claim 4, wherein extracting the joint feature representation comprises:

extracting the joint feature representation from the values of the at least one attribute and the coarse formats using a second learning network, the second learning network having been trained based on a set of sample data tables, cells in the set of sample data tables being set with corresponding formats.

6. The method of claim 5, wherein the second learning network is trained to meet at least one of the following objectives:

a first objective of having row-wise consistency in a first set of predicted formats that are determined for adjacent cells in a corresponding row of the set of sample data tables using the second learning network, or a second objective of having column-wise consistency in a second set of predicted formats that are determined for adjacent cells in a corresponding column in the set of sample data tables using the second learning network.

7. The method of claim 1, wherein, for a given cell of the plurality of cells, the at least one attribute comprises at least one of the following:

data filled in the given cell, a length of the data filled in the given cell, a type of the data filled in the given cell, proportions of different types of data filled in the given cell, a formula for generating the data filled in the given cell, or a merging status of the given cell, the merging status indicating whether the given cell is merged with a further cell to present the data or indicating a merging manner pattern with the further cell.

8. The method of claim 1, wherein the first learning network is trained based on a set of sample data tables, cells in the set of sample data tables being set with corresponding formats, and wherein the first learning network comprises a generator part of a conditional Generative Adversarial Network (cGAN).

9. An electronic device, comprising:

a processing unit; and a memory coupled to the processing unit and having instructions stored thereon, the instructions, when executed by the processing unit, causing the device to perform acts of:

obtaining values of at least one attribute for a plurality of cells in a data table, the values of the at least one attribute indicating at least one of a semantic meaning of data filled in the plurality of cells or a structure of the data table, the plurality of cells being arranged in rows and columns in the data table;

extracting a feature representation of the values of the at least one attribute using a first learning network by:

mapping the values of the at least one attribute to a corresponding vectorized representation;

extracting a global feature representation from the vectorized representation;

extracting, within the first learning network and from the global feature representation, a row-wise or column-wise feature representation, the row-wise or column-wise feature representation capturing specific distribution patterns in row or column directions; and obtaining a hybrid feature representation based upon a concatenation of the row-wise or column-wise feature representation to the global feature representation;

determining respective formats for the plurality of cells based on the feature representation using at least the first learning network;

adjusting the respective formats based upon a plurality of different target control indications to create a plurality of formats;

previewing, to a user, one or more of the plurality of formats in a graphical user interface (GUI) by displaying the data table adjusted according to one or more of the plurality of formats, the GUI allowing the user to select one of the plurality of formats;

receiving a selection of one of the plurality of formats; and causing the data table to be displayed to the user in the selected format.

10. A non-transitory machine-readable medium, storing instructions, which when executed, cause a machine to perform operations comprising:

obtaining values of at least one attribute for a plurality of cells in a data table, the values of the at least one attribute indicating at least one of a semantic meaning of data filled in the plurality of cells or a structure of the data table, the plurality of cells being arranged in rows and columns in the data table;

extracting a feature representation of the values of the at least one attribute using a first learning network by:

mapping the values of the at least one attribute to a corresponding vectorized representation;

extracting a global feature representation from the vectorized representation;

extracting, within the first learning network and from the global feature representation, a row-wise or column-wise feature representation, the row-wise or column-wise feature representation capturing specific distribution patterns in row or column directions; and obtaining a hybrid feature representation based upon a concatenation of the row-wise or column-wise feature representation to the global feature representation;

determining respective formats for the plurality of cells based on the hybrid feature representation using at least the first learning network;

adjusting the respective formats based upon a plurality of different target control indications to create a plurality of formats;

previewing, to a user, one or more of the plurality of formats in a graphical user interface (GUI) by displaying the data table adjusted according to one or more of the plurality of formats, the GUI allowing the user to select one of the plurality of formats;

receiving a selection of one of the plurality of formats; and causing the data table to be displayed to the user in the selected format.

11. The non-transitory machine-readable medium of claim 10, wherein the operation of determining the feature representation comprises:

concatenating the global feature representation with the extracted at least one of the row-wise feature representation or the column-wise feature representation, to obtain a hybrid feature representation; and determining the feature representation based on the hybrid feature representation.

12. The non-transitory machine-readable medium of claim 11, wherein the global feature representation and the row-wise feature representation comprise feature values arranged in rows and columns, and the operation of extracting the row-wise feature representation comprises: for each of the rows of the global feature representation, averaging feature values in the row to obtain an average row feature value; and spreading the average row feature value over a corresponding row of the row-wise feature representation.

13. The non-transitory machine-readable medium of claim 12, wherein the global feature representation and the column-wise feature representation comprise feature values arranged in rows and columns, and the operation of extracting the column-wise feature representation comprises: or each of the columns of the global feature representation, averaging feature values in the column to obtain an average column feature value; and spreading the average column feature value over a corresponding column of the column-wise feature representation.

14. The non-transitory machine-readable medium of claim 10, wherein the operation of determining the respective formats for the plurality of cells based on the hybrid feature representation comprises:

determining respective coarse formats for the plurality of cells based on the feature representation using the first learning network;

extracting a joint feature representation from the values of the at least one attribute and the coarse formats; and determining the respective formats for the plurality of cells based on the joint feature representation, such that a plurality of cells in at least one of a same row or a same column of the data table have a same format.

15. The non-transitory machine-readable medium of claim 14, wherein the operation of extracting the joint feature representation comprises:

extracting the joint feature representation from the values of the at least one attribute and the coarse formats using a second learning network, the second learning network having been trained based on a set of sample data tables, cells in the set of sample data tables being set with corresponding formats.

* * * * *